United States Patent [19]

Fukuma et al.

[11] 4,157,668

[45] Jun. 12, 1979

[54] PLANETARY GEARING WITH FLEXIBLE FRICTION SURFACES

[75] Inventors: Nobuo Fukuma, Toyota; Yoshito Katou, Aichi, both of Japan

[73] Assignee: Toyota Jidosha Kogyo Kabushiki Kaisha, Japan

[21] Appl. No.: 756,965

[22] Filed: Jan. 5, 1977

[30] Foreign Application Priority Data

Nov. 1, 1976 [JP] Japan ............................. 51-131534
Nov. 1, 1976 [JP] Japan ............................. 51-131535

[51] Int. Cl.² ........................................... F16H 13/06
[52] U.S. Cl. ........................................ 74/798; 74/202
[58] Field of Search ............... 74/802, 798, 198, 214, 74/215, 216, 202

[56] References Cited

U.S. PATENT DOCUMENTS

| Re. 26,978 | 10/1970 | Hewko | 74/798 |
|---|---|---|---|
| 1,071,719 | 9/1913 | Fast | 74/798 |
| 3,793,907 | 2/1974 | Nakamura et al. | 74/798 |
| 3,817,125 | 6/1974 | Nakamura et al. | 74/798 |

*Primary Examiner*—Benjamin W. Wyche
*Assistant Examiner*—James Yates
*Attorney, Agent, or Firm*—Stevens, Davis, Miller & Mosher

[57] ABSTRACT

A friction speed change gearing of the type comprising a plurality of planetary cylindrical rollers which make a planetary movement along an annular space defined by inner and outer races and a spider member engaged among the rollers in a sliding contact therewith, wherein flexible bearing shoes are provided in the spider member for improving the lubricating oil film maintained between the engaging surfaces of the roller and the spider member.

23 Claims, 9 Drawing Figures

PLANETARY GEARING WITH FLEXIBLE FRICTION SURFACES

BACKGROUND OF THE INVENTION

1. Field of the Invention

The present invention relates to a speed change gearing and, more particularly, a friction speed change gearing which transmits a rotational power while effecting a change in the rotational speed by employing a planetary mechanism including an inner race, an outer race and a plurality of cylindrical rollers interposed therebetween, wherein the rotational power is transmitted by friction engagement.

2. Description of the Prior Art

The friction speed change gearing having the aforementioned basic structure is known and is, in fact, practically used in accordance with various particular designs. In conventional designs, the friction speed change gearing of this particular type employs a spider member having spider fingers each of which is engaged into the planetary roller to operate as a bearing shaft which rotatably supports the roller along its central axis so that the rotary power is transmitted from the planetary rollers to the spider member or vice versa when the planetary rollers make a planetary movement along an annular space defined between an outer race and an inner race. However, this conventional design has a drawback in that when the rollers rotate at a high speed, a large quantity of heat generated in the roller is accumulated in the bearing portion and causes heavy wearing or sometimes burning or sticking. Furthermore, since the cylindrical planetary rollers are mounted between the inner and outer races and are under or subjected to an elastic deformation, a desired amount of power is transmitted among these frictionally engaged members depending upon the theory of elastic fluid lubrication, the cylindrical roller always rotates in a somewhat elliptically deformed condition, and, for this reason, it is difficult to provide a rotary bearing for the roller which can support it constantly in a smooth rotary engagement.

In view of these problems, in Japanese Patent Application No. 49793/73 the assignee has proposed to build a friction speed change gearing of this type by employing a spider member which engages among adjacent planetary rollers in a manner such that it slidably contacts the outer surface of the rollers instead of rotatably supporting the rollers at their axial portions. This new type of friction speed change gearing obviates the aforementioned problems involved in the conventional design of the friction speed change gearing and, when the bearing surface of the spider member which slidably contacts the outer surface of the roller is properly designed in a shape such that it generates a lubricating oil film between the spider member and the planetary roller, it certainly provides an improved performance. However, if we note the fact that in this type of friction speed change gearing the engagement between the inner and outer races and the planetary rollers is all rotary contact, and that due to this rotary contact this type of friction speed change gearing provides a very high transmission efficiency or, in other words, a very low friction loss, it will be appreciated that the sliding contact between the planetary rollers and spider member which is the sole sliding contact existing in this structure has a very important effect on the overall efficiency of the gearing and that a further improvement with regard to this point is very worthwhile for accomplishing further improvements with respect to this kind of friction speed change gearing.

SUMMARY OF THE INVENTION

The present invention looks at the matter from the aforementioned view point and contemplates a primary object of providing an improved friction speed change gearing having a higher transmission efficiency by further improving the sliding engagement between the cylindrical planetary rollers and the spider member in the friction speed change gearing of the type disclosed in the aforementioned Japanese Patent Application No. 49793/73.

In accordance with the present invention, the above-mentioned object in accomplished by a friction speed change gearing comprising a housing, first and second rotary shafts rotably supported in said housing in axial alignment with each other, an inner race supported by said first rotary shaft, an outer race supported by said housing to be co-axial with said inner race, a plurality of cylindrical rollers mounted between said inner and outer races under subjected to an elastic deformation, and a spider member supported by said second rotary shaft to engage among said rollers in sliding contact therewith and arranged to drive or to be driven by said rollers when they make a planetary movement, said spider member having flexible bearing shoes at its portions where it contacts said rollers.

By providing these flexible bearing shoes, a wedge shaped clearance, which maintains the most desirable oil film for the operating condition at any instant, is automatically formed between the cylindrical rollers and the spider member at their engaging portions, whereby the friction loss due to the sliding engagement between the rollers and the spider members is reduced thereby providing a higher transmission efficiency for the friction speed change gearing.

BRIEF DESCRIPTION OF THE DRAWING

In the accompanying drawing,

FIG. 3b is a view seen in the direction of arrow A in FIG. 3a;

FIG. 5b shows a modification of the embodiment shown in FIG. 5a;

DESCRIPTION OF THE PREFERRED EMBODIMENT

In the following, the invention will be described in more detail with reference to the accompanying drawing.

Figure 1:
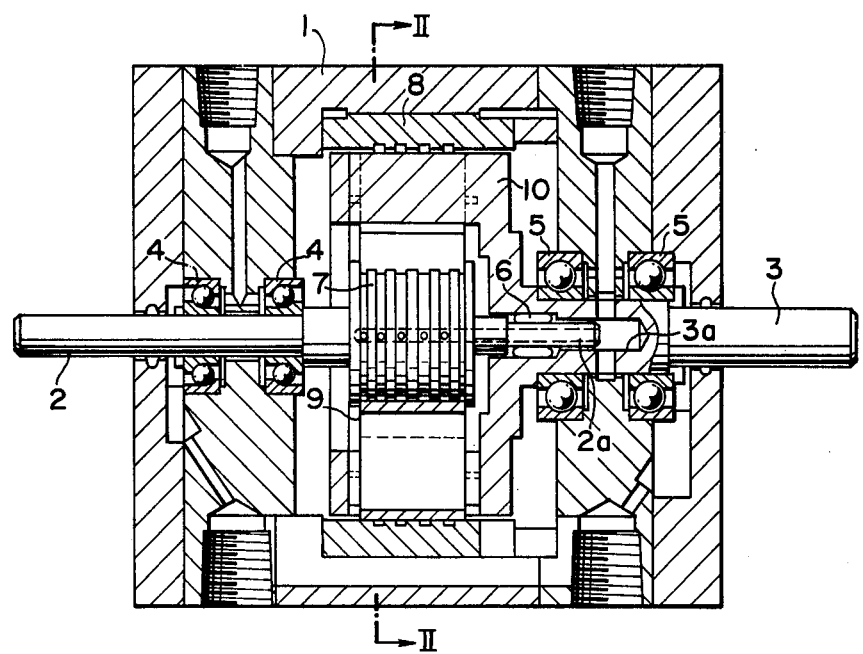
FIG. 1 is a longitudinal sectional view of an embodiment of the friction speed change gearing in accordance with the present invention.
Figure 2:
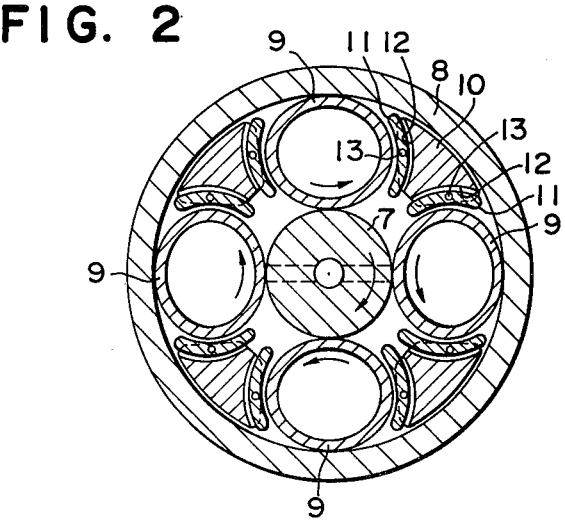
FIG. 2 is a somewhat schematical sectional view along line II—II in FIG. 1, wherein the housing is omitted.

Referring to FIG. 1, 1 designates a housing of the friction speed change gearing. In the shown embodiment, the housing is composed of several parts for the convenience of production and assembly. A first rotary shaft 2 and a second rotary shaft 3 are mounted in the housing 1 as rotatably supported by bearing means 4 and 5, respectively, in axial alignment with each other. In the following, only for the purpose of explanation, the shaft 2 is called the "input shaft" while the shaft 3 is called "output shaft", although they may be operated in a reversed manner so that the shaft 3 is an input shaft while the shaft 2 is an output shaft. In this connection, in the former case the friction speed change gearing naturally operates as a reduction gearing, whereas in the latter case the gearing operates as a multiplying gearing. The inner end of the input shaft 2 is formed as a reduced portion 2a which is rotatably received in a bearing bore 3a formed in the inner end portion of the output shaft 3 by way of needle elements 6, whereby the input and output shafts 2 and 3 are rotatably connected with or supported by each other at their inner ends and individually rotate around a common axis. An inner race 7 is mounted on the input shaft 2, and, in co-axial relation to the inner race, an outer race 8 is supported by the housing 1. Between the inner race 7 and the outer race 8 are mounted a plurality of cylindrical rollers 9 which are under and subjected to elastic deformation in diametrical directions so that the rollers present a somewhat elliptical configuration as shown in FIG. 2 in an exaggerated manner. Among the rollers is engaged a spider member 10 supported by the output shaft 3, said spider member slidably engaging a part of the outer surface of the cylindrical rollers so that the spider member drives or is driven by said rollers when they make a planetary movement around the annular space formed between the inner and outer races.

The spider member 10 has flexible bearing shoes 11 which slidably engage with the cylindrical rollers 9. In the embodiment shown in FIG. 2, each bearing shoe is mounted in a recess 12 formed in the spider body by a pivot shaft 13.

Figure 3A:
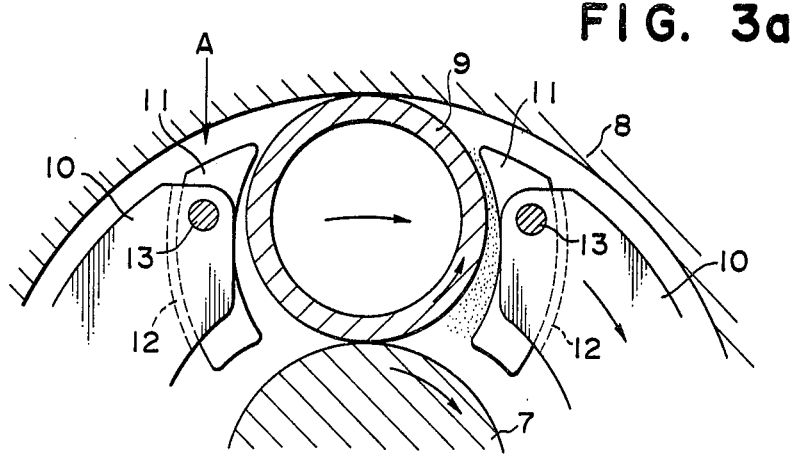
FIG. 3a is a side view showing an embodiment of the flexible bearing shoes in more detail.
Figure 3B:
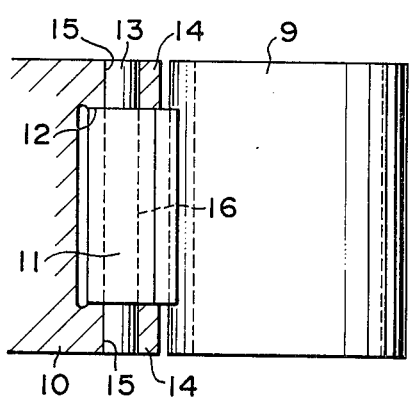

FIG. 3a shows an embodiment of the bearing shoes 11 in more detail in a side view and FIG. 3b is a view seen in the direction of arrow A in FIG. 1. As shown in these figures, the spider member 10 is formed with pairs of bearing portions 14, 14' at opposite sides of recesses 12 formed at opposite ends of each finger portion of the spider member, and the bearing portions are formed with bearing bores 15, 15' for receiving the pivot shaft 13. In this case, it is desirable that the pivot shaft 13 is made as a pin element which is passed through a bore 16 formed in the bearing shoe 11 and is received in the bearing bores 15 at its opposite ends. The pin element should preferably be made to have a little larger diameter than the bore 16 of the bearing shoe and to be forced into the bore 16 during assembly, thereby providing a firm assembly of the bearing shoe and the pivot shaft.

In operation, when the input shaft 2 is rotated in the clockwise direction as indicated by an arrow in FIG. 2, each roller 9 rotates around its own axis in the anticlockwise direction as indicated by arrows in FIG. 2, while it rotates as a whole along the annular space formed between the inner and outer races to make a planetary movement under the action of a traction force effected by elastic fluid lubrication acting between the rollers and the inner and outer races. By the planetary movement of the rollers 9, the spider member 10 engaged among these rollers to be in sliding contact at the bearing shoes 11 is also driven in the clockwise direction thereby driving the output shaft 3 connected therewith also in the clockwise direction. The reduction ratio of the output shaft 3 to the input shaft 2 is, as well known in art, expressed by R1/(R1+R2), wherein R1 and R2 are radii of the inner and outer races, respectively. As a matter of course, if the gearing is operated in the reverse manner as a multiplying gearing, the multiplying ratio is (R1+R2)/R1.

The shape of the wedge-shaped clearance to be formed between the engaging surfaces of the roller 9 and the bearing shoe 11 for maintaining the most desirable lubricating film varies in accordance with the rotational speed and load of the friction speed change gearing. In accordance with the present invention, the bearing shoe 11 is automatically inclined around the pivot shaft 13 in accordance with such variations in operating conditions and automatically forms an optimum wedge-shaped clearance required for maintaining the most desirable lubricating oil film in any operating conditions.

As shown in FIGS. 2, 3a and 3b, the bearing shoes 11 may preferably be provided at opposite ends of the individual finger portions of the spider member 10 so that the roller 9 can be engaged at both sides thereof, so that when the friction speed change gearing is incorporated in the transmission system of an automobile, the power transmission between the rollers and the spider member is constantly effected regardless whether the automobile is in the engine drive condition or in the engine brake condition. In the embodiment shown in FIG. 3a, the bearing shoes 11 provided at opposite sides of each one of the rollers 9 are arranged to be substantially symmetrical with respect to a plane which traverses the central axes of the roller 9 and the rotary shafts 2 and 3 and, particularly, the pivot shafts 13 are located outside of a circle drawn by the centers of said rollers when they make a revolution in a planetary movement.

Figure 4:
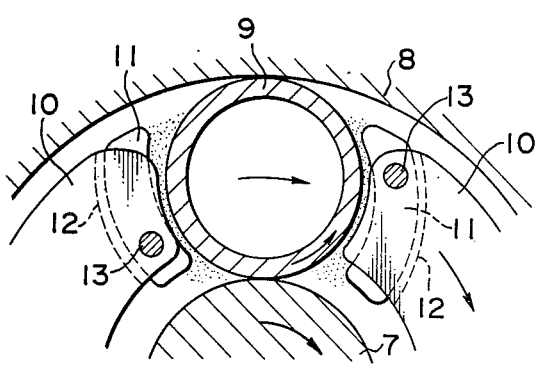
FIG. 4 is a view similar to FIG. 3a showing another embodiment of the flexible bearing shoes.

FIG. 4 shows still another embodiment of the present invention in a view similar to FIG. 3a. In this embodiment, in order that the most desirable oil film is maintained at both sides of the roller 9 when the gearing rotates in a predetermined direction as shown by an arrow in the figure, the bearing shoe 11 located at the leading side of the roller (rightward in FIG. 4) and the bearing shoe 11 located at the trailing side of the roller (leftward in FIG. 4) are formed to be substantially symmetrical with respect to the central axis of the roller. By this arrangement, as long as the friction speed change gearing is operated in the predetermined direction, the most desirable oil film is maintained at both sides of the roller.

Figure 5A:
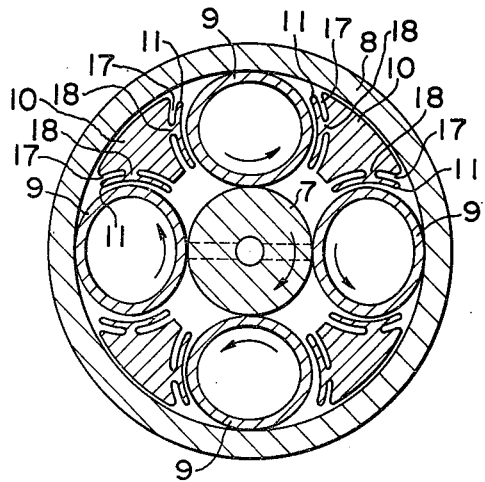
FIG. 5a is a view similar to FIG. 2, showing another embodiment of the friction speed change gearing in accordance with the present invention.

FIG. 5a is a view similar to FIG. 2 showing another embodiment of the present invention, wherein the portions corresponding to those shown in FIG. 2 are designated by the same reference numerals. In this embodiment, the bearing shoes 11 are formed as an integral portion of the body of the spider member 10 and isolated therefrom by slits 17 while leaving supporting portions 18. If the thickness of the bearing shoes 11 and the position of the supporting portions 18 are properly determined in accordance with the operating conditions of the friction speed change gearing, the bearing shoes 11 will have a certain flexibility which allows them to automatically incline in a manner such that an optimum wedge-shaped clearance for generating the most desirable lubricating oil film between the contacting surfaces of the bearing shoes and the rollers is maintained over the entire operational region of the gearing.

In the embodiment of FIG. 5a, the bearing shoes 11 are also provided on opposite sides of each of the rollers 9 so as to be able to simultaneously co-operate with the roller. Furthermore, the bearing shoes provided on opposite sides of each of the rollers are arranged to be substantially symmetrical with respect to a plane which traverses the central axes of the roller and said rotary shafts, and particularly, the supporting portions 18 are located outside of a circle drawn by the centers of said rollers when they revolve during planetary movement.

Figure 5B:
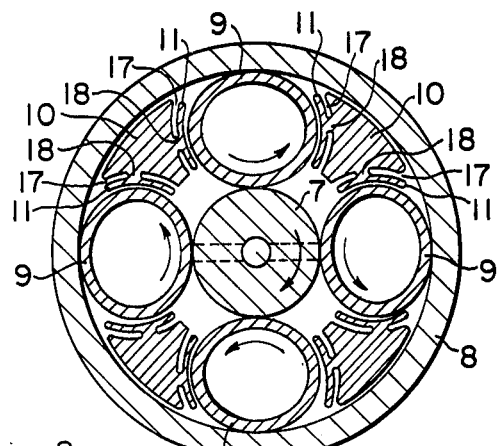

FIG. 5b shows a modification of the embodiment shown in FIG. 5a, wherein the bearing shoes provided on opposite sides of each of the rollers are arranged to be substantially symmetrical with respect to the central axes of the roller so that the supporting portions of a first group of bearing shoes which are driven by the rollers when they make a revolution in one direction in the planetary movement are located at the outside of a circle drawn by the centers of said rollers, whereas the supporting portions of the other bearing shoes located opposite to said first group of bearing shoes are located at the inside of said circle.

Figure 6:
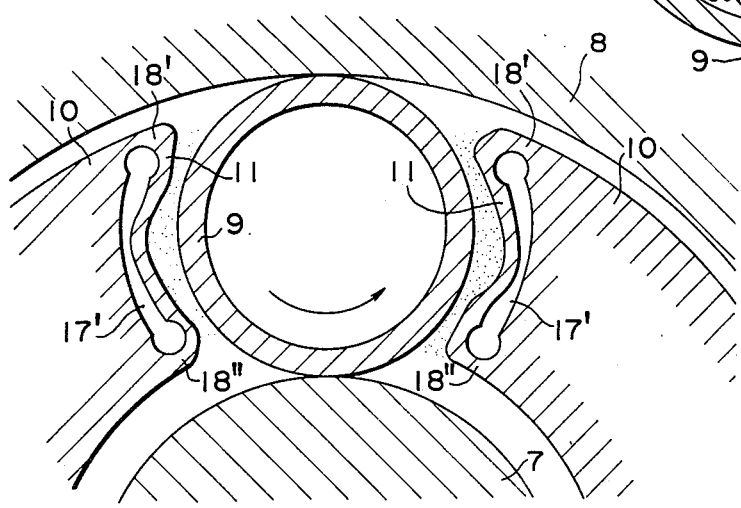
FIG. 6 is a sectional view showing another embodiment of the flexible bearing shoes in an enlarged scale; and, FIG. 7 is a view similar to FIG. 6, showing still another embodiment of the flexible bearing shoes in accordance with the present invention.

FIG. 6 shows still another embodiment of the present invention. In this embodiment the bearing shoes 11 formed as an integral part of the spider member 10 are defined by slits 17' ending adjacent outer and inner peripheries of the spider member thereby leaving outside and inside supporting portions 18', 18''. The bearing shoes 11 thus formed are also capable of automatically deforming in an inclined manner such as shown in FIG. 6 thereby forming an optimum wedge-shaped clearance between the contacting surfaces of the bearing shoes and the rollers which generates the most desirable lubricating oil film when the friction speed change gearing is operating.

Figure 7:
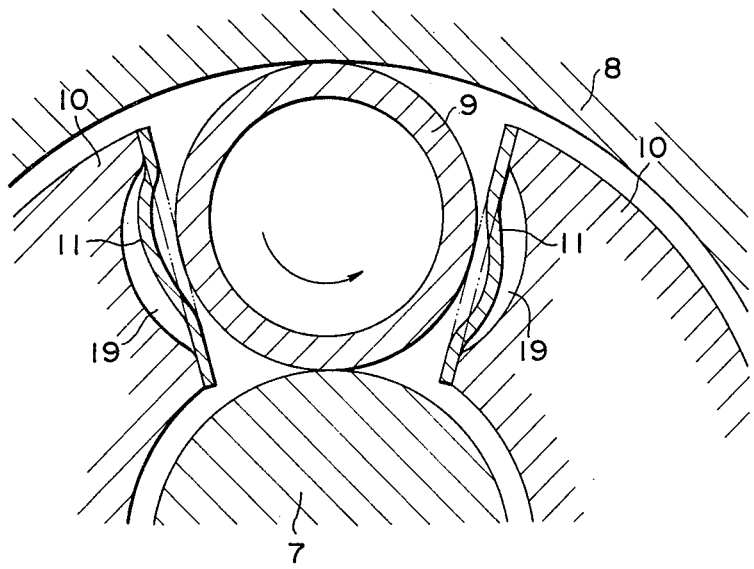

FIG. 7 is a view similar to FIG. 6 showing still another embodiment of the present invention. In this embodiment the bearing shoes 11 are provided by separate members such as thin steel plate pieces attached to the body of the spider member 10. The recesses 19 are formed at opposite ends of the finger body of the spider member for allowing the bearing shoes to deform therein while making a wedge-shaped clearance for the lubricating oil film. The plate pieces 11 may be firmly connected to the body of the spider member at opposite ends thereof by welding or other suitable connecting means and, in this case, the bearing structure shown in FIG. 7 will operate substantially in the same manner as that shown in FIG. 6.

Particularly in the embodiment shown in FIGS. 6 and 7, it is desirable that each roller 9 operates simultaneously with two bearing shoes provided on opposite sides thereof as in the embodiment shown in FIG. 4. By contrast to the embodiment shown in FIG. 4, the bearing shoes in the embodiments shown in FIGS. 6 and 7 can deform in both ways which are suitable for the forward and rearward operation of the friction speed change gearing. In FIGS. 6 and 7 the deformation of the bearing shoes provided on opposite sides of the roller is substantially symmetrical with respect to the central axis of the roller, although the two co-operating bearing shoes are normally arranged to be substantially symmetrical with respect to a plane which traverses the central axes of the roller 9 and the rotary shafts 2 and 3. This symmetrical deformation of the bearing shoes is automatically accomplished in accordance with the operation of the gearing in a particular direction and the deformation will automatically reverse when the direction of operation of the gearing is reversed. Therefore, the embodiments such as shown in FIGS. 6 and 7 have an advantage in that good lubrication is constantly effected on opposite sides of the roller regardless of the direction of operation of the gearing such as engine driving or engine braking encountered in an automobile transmission.

It will also be appreciated that the embodiments shown in FIGS. 5 and 6 having bearing shoes formed as an integral part of the spider member have an advantage in that they are obtained at a relatively low cost. In the embodiment shown in FIG. 5, the bearing shoes are provided by forming the slits 17, from outside and inside peripheral portions of individual finger portions of the spider member by employing a proper sawing device. In the embodiment shown in FIG. 6 the slits 17' can also be formed readily by first boring two bores adjacent outside and inside peripheries of the individual spider fingers and secondly sawing a slit from one of the bores to the other.

Although the invention has been shown and described with reference to some preferred embodiments thereof, it is to be noted by those skilled in the art that various modifications may be made with regard to these embodiments without departing from the spirit of the invention.

We claim:

1. A lubricated friction speed change gearing comprising a housing, first and second rotary shafts rotatably supported in said housing on collinear axes, an inner race supported by said first rotary shaft, an outer race supported by said housing to be coaxial with said inner race, a plurality of cylindrical rollers mounted between said inner and outer races and compressed and elastically deformed therebetween, and a spider member supported by said second rotary shaft to engage among said rollers in sliding contact therewith and arranged to drive or to be driven by said rollers when they perform planetary movement, said spider member having bearing shoes at its bearing portions where it contacts said rollers, the major portion of each of said shoes being capable of slight displacement relative to the body of said spider member so as to form a gap capable of changing its shape between said portion of said shoe and the one of said rollers with which said shoe is in contact, so that the lubricant cushion is adapted to a wide range of operating conditions.

2. The gearing of claim 1, wherein said bearing shoes are pivotably supported by pivot shafts from the body of said spider member.

3. The gearing of claim 2, wherein said bearing shoes are each received in a recess formed in the body of said spider member and are each pivotably supported by said pivot shaft.

4. The gearing of claim 2, wherein said bearing shoes are provided on opposite sides of each of said rollers.

5. The gearing of claim 4, wherein said bearing shoes are provided on opposite sides of each one of said rollers to be substantially symmetrical with respect to a plane which traverses the central axes of the roller and said rotary shafts.

6. The gearing of claim 5, wherein said pivot shafts are located outside of a circle drawn by the centers of said rollers when they make a revolution.

7. The gearing of claim 2, wherein said bearing shoes are provided on opposite sides of each one of said rollers to be substantially symmetrical with respect to the central axis of the roller.

8. The gearing of claim 7, wherein first bearing shoes which are driven by said rollers when they make a revolution in one direction are supported by said pivot shafts at the outside of a circle drawn by the centers of said rollers, whereas the other bearing shoes located opposite to said first bearing shoes are supported by said pivot shafts at the inside of said circle.

9. The gearing of claim 1, wherein said bearing shoes are formed as an integral part of the body of said spider member isolated by slits while leaving supporting portions.

10. The gearing of claim 9, wherein said supporting portions are one in number for each shoe and are located at approximately central portions of the shoes.

11. The gearing of claim 10, wherein said bearing shoes are provided on opposite sides of each one of said rollers.

12. The gearing of claim 11, wherein said bearing shoes are provided on opposite sides of each one of said rollers to be substantially symmetrical with respect to a plane which traverses the central axes of the roller and said rotary shafts.

13. The gearing of claim 12, wherein said supporting portions are located outside of a circle drawn by the centers of said rollers when they make a revolution.

14. The gearing of claim 11, wherein said bearing shoes are provided on opposite sides of each one of said rollers to be substantially symmetrical with respect to the central axis of the roller.

15. The gearing of claim 14, wherein said supporting portions of first bearing shoes which are driven by said rollers when they make a revolution in one direction are located at the outside of a circle drawn by the centers of said rollers, whereas said supporting portions of the other bearing shoes located opposite to said first bearing shoes are located at the inside of said circle.

16. The gearing of claim 9, wherein said supporting portions are two in number for each shoe and are located at its opposite ends.

17. The gearing of claim 16, wherein said bearing shoes are provided on opposite sides of each one of said rollers.

18. The gearing of claim 17, wherein said bearing shoes provided at opposite sides of each one of said rollers are arranged to be substantially symmetrical with respect to a plane which traverses the central axes of the roller and said rotary shafts.

19. The gearing of claim 1, wherein said bearing shoes are provided by separate members such as thin steel plate pieces attached to the body of said spider member, the body of the spider member being formed with recesses at portions located under a central portion of said separate members.

20. The gearing of claim 19, wherein each of said separate members is supported at its opposite ends by the body of said spider member.

21. The gearing of claim 19, wherein said bearing shoes are provided on opposite sides of each one of said rollers.

22. The gearing of claim 21, wherein said bearing shoes provided at opposite sides of each one of said roller are arranged to be substantially symmetrical with respect to a plane which traverses the central axes of the rollers and said rotary shafts.

23. The gearing of claim 1, wherein said rollers are each a hollow cylinder.

* * * * *